UNITED STATES PATENT OFFICE.

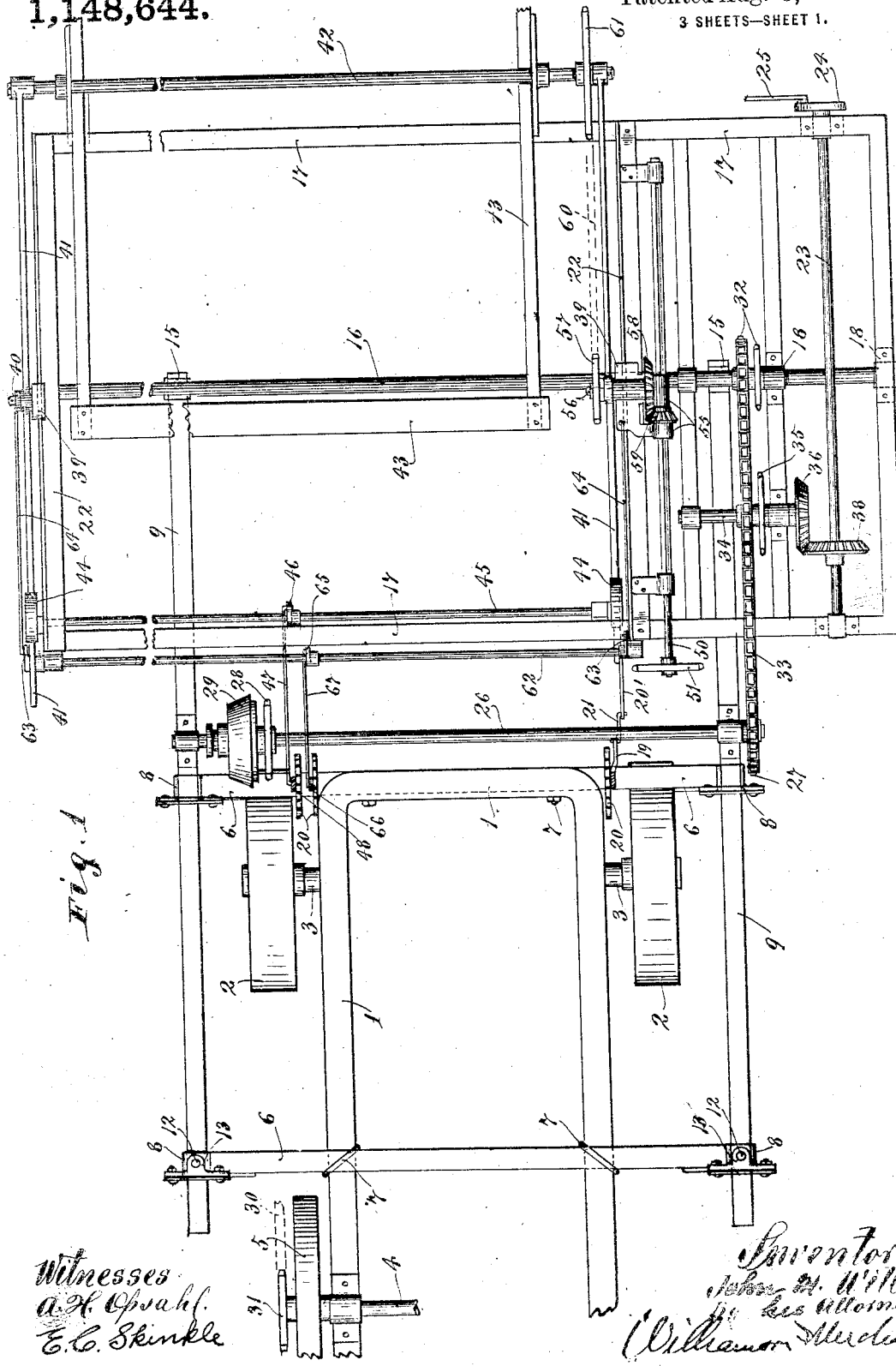

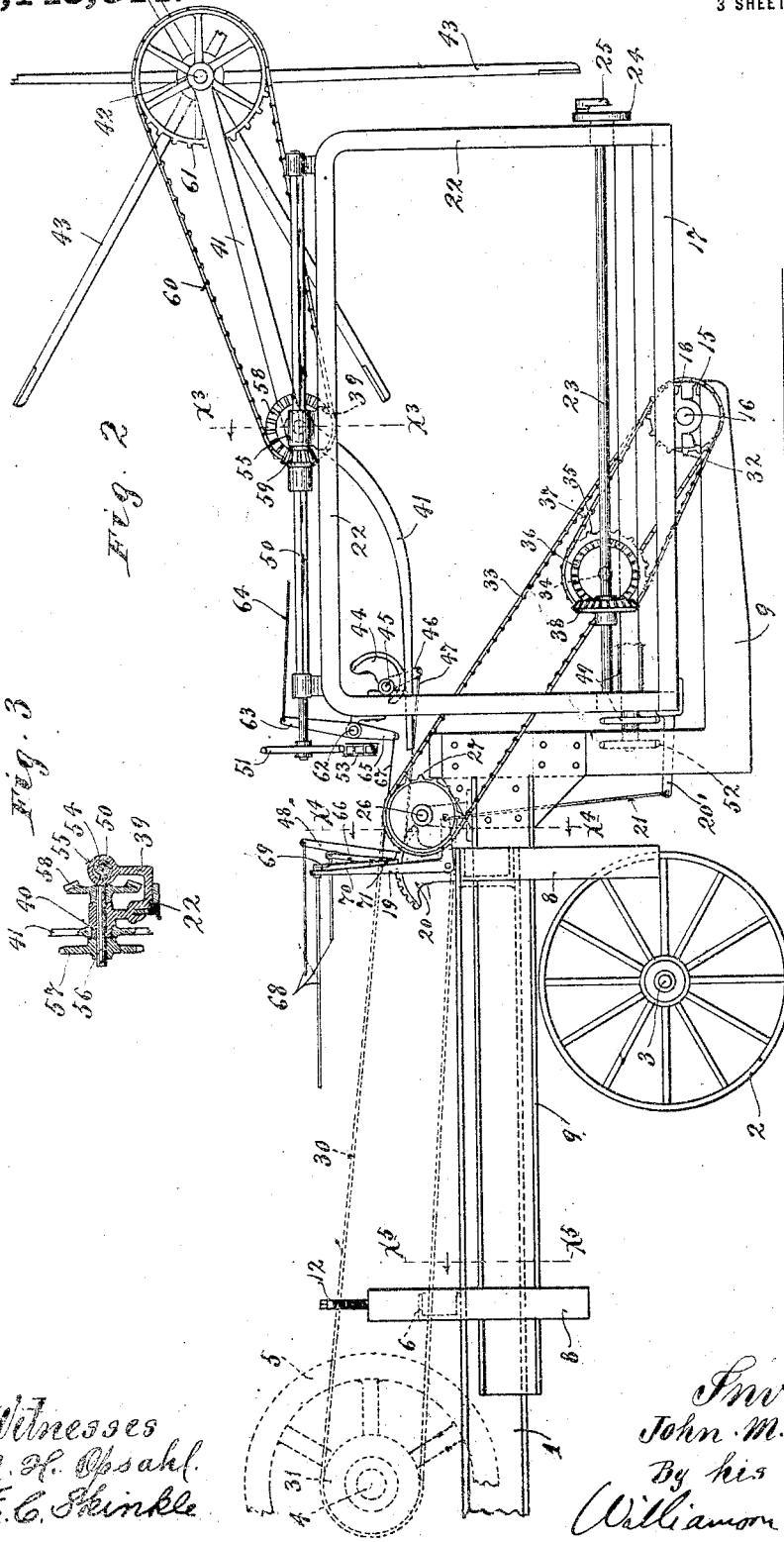

JOHN M. WILL, OF OAKES, NORTH DAKOTA.

HARVESTER ATTACHMENT FOR TRACTORS.

1,148,644.  Specification of Letters Patent. Patented Aug. 3, 1915.

Application filed July 6, 1914. Serial No. 849,152.

*To all whom it may concern:*

Be it known that I, JOHN M. WILL, citizen of the United States, residing at Oakes, in the county of Dickey and State of North Dakota, have invented certain new and useful Improvements in Harvester Attachments for Tractors; and I do hereby declare the following to be a full, clear, and exact description of the invention, such as will enable others skilled in the art to which it appertains to make and use the same.

My present invention has for its object to provide a harvester attachment for tractors and is in the nature of an improvement on my U. S. Letters Patent, entitled "Harvester attachments for traction engines," No. 914,097, issued of date March 2, 1909.

To the above end, the invention consists of the novel devices and combinations of devices hereinafter described and defined in the claims.

In the accompanying drawings, which illustrate the invention, like characters indicate like parts throughout the several views.

Figure 4:
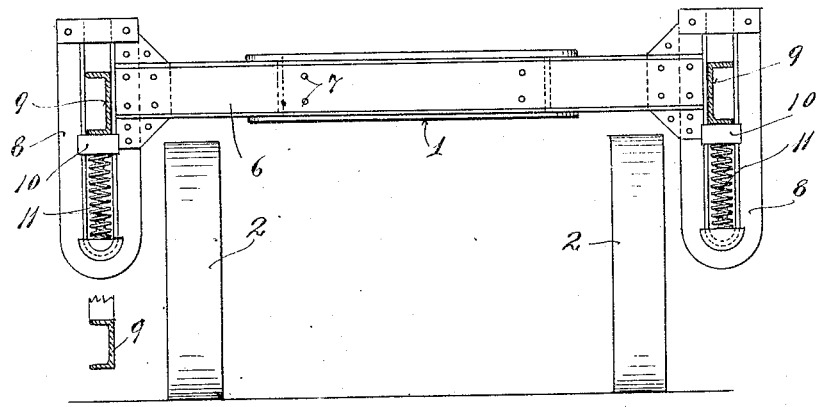
Figure 5:
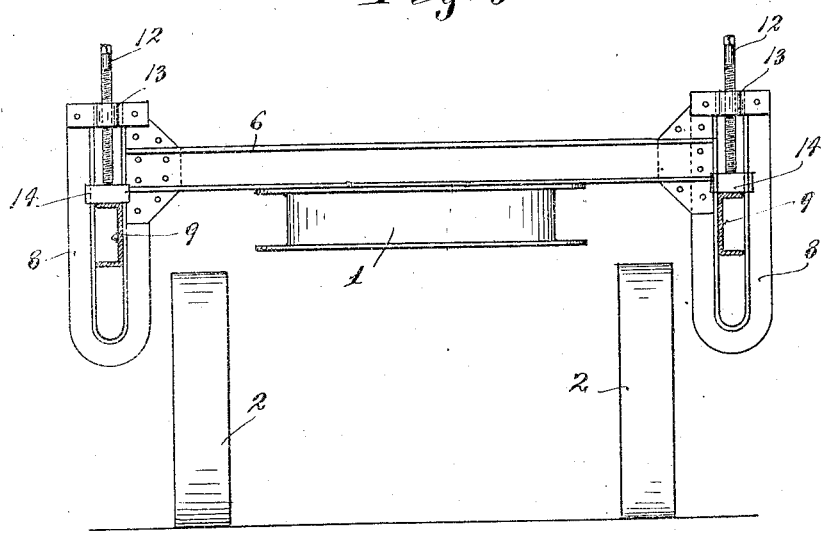

Referring to the drawings, Figure 1 is a plan view showing the improved harvester attachment applied in working position to a tractor; Fig. 2 is a side elevation of the same; Fig. 3 is a detail view, in section, taken on the line $x^3\ x^3$ of Fig. 2; Fig. 4 is a view partly in front end elevation and partly in transverse vertical section, taken on line $x^4\ x^4$ of Fig. 2; and Fig. 5 is a view partly in front end elevation and partly in transverse vertical section, taken on the line $x^5\ x^5$ of Fig. 2.

Of the parts of the tractor, it is only necessary to note the main frame 1, constructed from a heavy channel iron, the front wheels 2, the front axle 3, the explosive engine shaft 4, and the fly wheel 5.

The improved harvester attachment is supported from the frame 1 by front and rear transverse channel beams 6, the former of which extends between the flanges of the frame 1 at the front transverse portion thereof, and the latter of which rests directly on the frame 1 just in front of the engine shaft 4. Clips 7 are provided for detachably securing the beams 6 to the frame 1. Rigidly secured to the ends of the beams 6 are U-shaped guides 8 constructed of angle irons, the front and rear guides 8 on each side of the tractor being alined parallel with the sides of said tractor.

Mounted in each pair of guides 8 is a heavy platform supporting lever 9 constructed from a channel iron. These levers 9 are intermediately fulcrumed on blocks 10, slidably mounted in the front guides 8 and supported on heavy coiled springs 11 which rest on the lower transverse portions of said guides. The rear ends of the levers 9 are held in different vertical positions by long adjusting screws 12 which have threaded engagement with transverse tie bars 13, which connect the upper ends of the rear guides 8. Bearing blocks 14 are interposed between the levers 9 and lower ends of the screws 12 and are slidably mounted on said guides.

The platform supporting levers 9, forward of their fulcrums, are extended vertically downward in front of the tractor and then horizontally forward, and have secured on their outer end portions bearings 15. Journaled in the bearings 15 is a long, transversely extended, platform supporting torsion rod 16. The platform 17 of the harvester may be of substantially the usual rectangular form and it is extended parallel to and just above the torsion rod 16, and, by a multiplicity of suitable bearings 18, is secured thereto for oscillatory movement transversely of the tractor. This so-called torsion rod 16 also stiffens the long rectangular platform frame 17 and, by oscillating said platform frame thereon, the outer edge thereof may be raised and lowered to vary the height of the cut made by the sickle, not shown, but which, as will be understood, will be applied in the usual way to the front edge of said platform.

The platform frame 17 is oscillated and held in different set positions by a bell crank 19 pivoted to one, to-wit the right-hand, of three segments 20, rigidly secured to the upper flange of the front beam 6. The short arm of the bell crank 19 is connected to a rearwardly extended arm 20' on the platform frame 17 by a link 21. The long arm of this bell crank 19 is operated and locked to the right hand segment 20 in a manner that will presently be described.

Inverted U-shaped frames 22 are rigidly secured at their lower ends to the platform frame 17. One of these frames 22 is located at the left hand end of the platform frame 17 and the other thereof is located a distance considerably inward from the right hand end of said frame. Journaled in suitable bearings on the frame 22 is a horizontally extended shaft 23 which extends at right angles to the rod 16 and has keyed to its outer end a crank disk 24 to the crank pin of which a sickle driving pitman 25 is connected in the customary manner. The shaft 23 is driven from the engine shaft 4 by the following connections: Journaled in bearings on the levers 9, just forward of their fulcrums, is a transverse countershaft 26, having keyed to its right hand end a sprocket wheel 27. On the other, or left hand, end of the shaft 26 is a sprocket wheel 28, rigidly secured to the hub of the inner member of a cone clutch 29. The inner member of this clutch 29 is free for rotation on the shaft 26 and the other, or outer, member thereof is keyed for rotation with said shaft, with freedom for sliding movement thereon. Any suitable means, such as a shipper lever, may be employed for shifting the outer clutch member into and out of contact with the inner member thereof. A long sprocket chain 30 runs over the sprocket wheel 28 and a sprocket wheel 31, secured to the shaft 4, outward of the fly wheel 5. Loosely journaled on the rod 16 is a pair of integrally formed sprockets 32. The inner sprocket 32 is alined with the sprocket wheel 27 and a relatively long sprocket chain 33 runs over said two sprockets. Intermediately located between the rod 16 and shaft 26 is a short countershaft 34, journaled in suitable bearings on the platform frame 17. Keyed to this countershaft 34 is a sprocket wheel 35 and a bevel gear 36. The sprocket wheel 35 is alined with the outer sprocket wheel 32 and a sprocket chain 37 runs over said two sprockets. The bevel gear 36 meshes with a bevel gear 38, keyed to the shaft 23, and completes the connections between the engine shaft 4 and shaft 23. The binder, not shown, may also be driven from the shaft 23 by the usual or any suitable means.

Slidably mounted upon the upper horizontal portions of the frame 22 is a pair of bearing brackets 39, provided with trunnions 40 upon which are intermediately fulcrumed reel supporting levers 41. In the forwardly projecting ends of the levers 41 is journaled a reel shaft 42 that carries a reel 43. The rearwardly projecting ends of the levers 41 are actuated, to raise and lower the reel 43, by cams 44 that are rigidly secured to the opposite ends of a long rock shaft 45 journaled in suitable bearings on the rear vertical portions of the two frames 22. On the central portion of the rock shaft 45 is a depending arm 46 that is connected by a rod 47 to the intermediate portion of a lever 48 which is pivotally secured at its lower end to the left hand segment 20. Suitable means will presently be described for setting this lever in different positions and for locking the same to the segment 20, to which it is connected.

The reel 43 is driven from one of the sprocket wheel equipped driven rollers 49 of the customary canvas conveyer, not shown, by the following connections: On the horizontal portion of the right hand frame 22 is a horizontally extended shaft 50 extended parallel with the shaft 23 and journaled in suitable bearings on said frame. To the inner end of the shaft 50 is rigidly secured a sprocket wheel 51 alined with a sprocket wheel 52 fast with the sprocket wheel of the roller 49 and over which sprockets 51 and 52 runs a sprocket chain 53. The intermediate portion of the shaft 50 is made square in cross section and has slidably mounted thereon a two-part sleeve 54 journaled in laterally spaced bearings 55, integrally formed on the right hand bearing bracket 39. Intermediately journaled in the trunnion 40 of the right hand bracket 39 is a stub shaft 56, having secured to one end thereof a sprocket wheel 57 and to the other end thereof a bevel gear 58. The bevel gear 58 meshes with the bevel pinion 59 mounted on the squared portion of the shaft 50 for rotation therewith, but with freedom for sliding movement thereon. This bevel pinion 59 is also mounted between the bearings 55 and is held thereby in mesh with the bevel gear 58. A relatively long sprocket chain 60 runs over the sprocket wheel 57 and a relatively large sprocket wheel 61, rigidly secured to the reel shaft 42, which chain completes the driving connections between the roller 49 and the reel shaft 42.

Sliding movement is imparted to the bearing brackets 39 by the following connections: A rock shaft 62 is journaled in suitable bearings on the rear vertical members of the frames 22 and provided with a pair of upwardly projecting arms 63, connected, one to each of the bearing brackets 39, by rods 64. Rigidly secured to the intermediate portion of the rock shaft 62 is a depending arm 65, connected to the intermediate portion of a lever 66 by a link 67. The lever 66 is pivoted at its lower end to the central segment 20.

Long rods 68, three in number, are journaled at their forward ends, one in the upper end of the long arm of the bell crank 19 and the other two, one in each of the upper ends of the levers 48 and 66. The extreme forward ends of these rods 68 are equipped with short cranks 69, connected by rods 70 to latches 71. These latches 71 are slidably mounted on the bell crank 19 and levers 48 and 66 for interlocking engagement with the segments 20. The rear ends of the rods 68, not shown, will, in actual usage, be extended to the rear of the tractor, within easy reach of the operator. Obviously, by rotating the rod 68 the latches 71 may be moved into and out of engagement with the segments 20 and, by moving said rods endwise, the long arm of the bell crank 19 and the two levers 48 and 66 may be oscillated with respect to the segments 20, at will.

As already stated, the harvester attachment, as an entirety, may be vertically adjusted, by turning the screws 12, for setting the supporting levers 9 in different adjustments. The adjustment of the supporting levers 9 vertically will not, at any time, affect the operative length of the chain 30. In mounting the levers 9 on the main frame 1, the same are adjusted longitudinally thereon to bring the platform frame 17 into its proper relation to the tractor. After the levers 9 are properly adjusted longitudinally on the frame 1, the length of the chain 30 is adjusted either by a chain tightener, not shown, or by taking out or adding links.

By manipulating the right hand rod 68, the harvester platform may be oscillated on the torsion rod 16 so as to raise and lower the sickle, but which, as already stated, may be applied in the usual way to the front edge of the binder platform. By operating the left hand lever 68, the cams 44 may be moved so as to act upon the rear ends of the reel supporting levers 41 and thereby raise or lower the reel 43, as desired. By movements of the intermediate lever 68, the bearing brackets 39 may be slid forward or backward on the frames 22 so as to move the reel 43 in a forwardly or rearwardly direction, as may be desired, to position the same for the most efficient delivery of the standing grain to the sickle.

As is evident, the driving connections to the sickle and reel remain operative throughout all of the adjustments of said sickle and reel and in no way interfere with said adjustments.

When it is desired to use the tractor for other purposes than that of carrying the harvester attachment, said attachment may be very quickly detached from the tractor, and, when desired, may be again very quickly and easily applied thereto.

What I claim is:

1. The combination with a tractor having front and rear pairs of laterally spaced guides, vertically movable spring-supported fulcrums mounted in the front pair of said guides, and adjusting devices mounted in the rear pair of said guides, of a pair of platform supporting levers, intermediately supported on said fulcrums and having their rear ends held in different vertical positions by said adjusting devices, and a harvester carried by said levers, in front of said tractor.

2. The combination with a tractor, having front and rear pairs of laterally spaced guides, vertically movable spring-supported fulcrums mounted in the front pair of said guides, and adjusting screws mounted in the rear pair of said guides, of a pair of platform supporting levers extended through said guides, intermediately supported on said fulcrums and having their rear ends held in different vertical positions by said adjusting screws, and a harvester carried by said levers, in front of said tractor.

3. The combination with a tractor, having front and rear pairs of laterally spaced guides, vertically movable spring-supported fulcrums mounted in the front pair of said guides, and adjusting devices mounted in the rear pair of said guides, of a pair of platform supporting levers, mounted for longitudinal adjustment in said guides, intermediately supported on said fulcrums and having their rear ends held in different vertical positions by said adjusting devices, and a harvester carried by said levers, in front of said tractor.

4. The combination with a tractor and laterally spaced platform supports secured to and projecting forward thereof, of a harvester comprising a platform pivotally mounted on the forward end portions of said platform supports, means for setting said platform in different angular adjustments, a sickle driving wheel mounted on said platform, and driving connections from the engine of said tractor to said sickle driving wheel, including a wheel at the axis of the pivotal support of said platform, whereby said platform may be set in different angular adjustments with respect to its supports without affecting the driving connections from the engine of said tractor to said sickle driving wheel.

5. The combination with a tractor, laterally spaced platform supports fulcrumed to and projecting forward thereof, and adjusting devices for supporting the forward end portions of said supports in different vertical positions, of a harvester, comprising a platform mounted on the forward end portions of said supports, means for setting said platform in different angular adjustments, a sickle driving wheel mounted on said platform, and driving connections from the engine of said tractor to said sickle driving wheel, including a countershaft in the vicinity of the fulcrums of said platform supports and a wheel at the axis of the pivotal support of said platform, whereby said platform may be set in different angular adjustments with respect to its supports without affecting the driving connection from the engine of said tractor to said sickle driving wheel.

In testimony whereof I affix my signature in presence of two witnesses.

JOHN M. WILL.

Witnesses:
J. A. McKee,
R. E. Wessel.